Sept. 11, 1923.
G. A. LYON
AUTOMOBILE BRACE BAR AND BUFFER
Original Filed Jan. 14, 1920
1,467,382
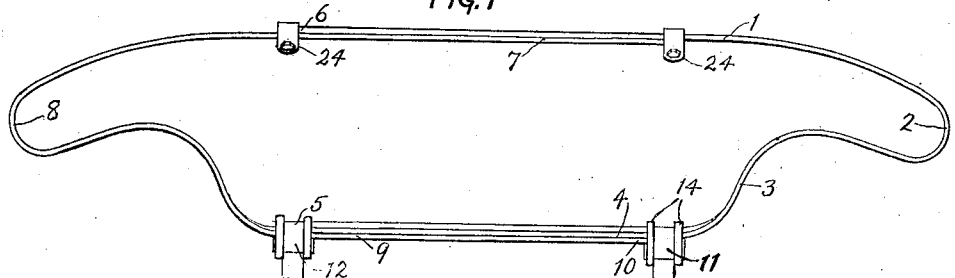
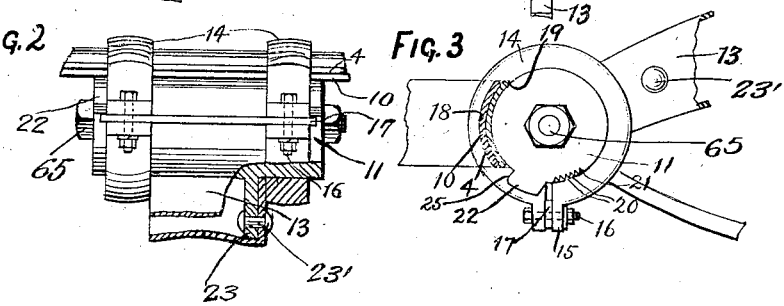
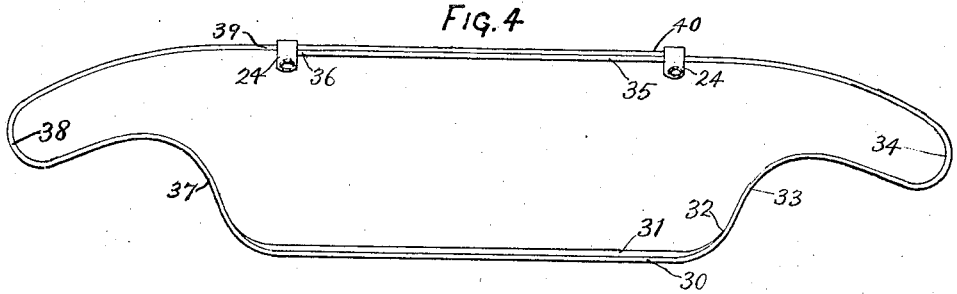
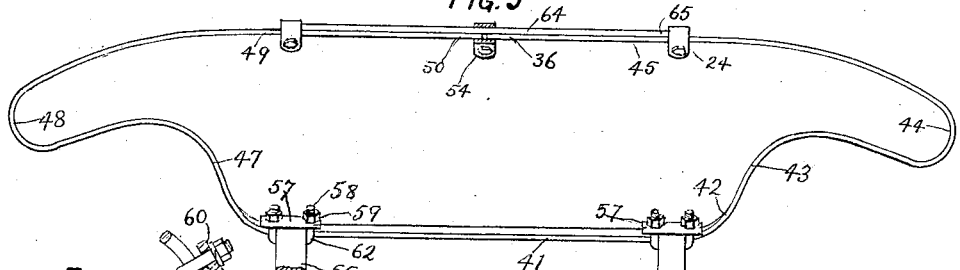
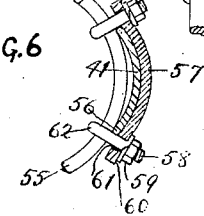

Patented Sept. 11, 1923.

1,467,382

UNITED STATES PATENT OFFICE.

GEORGE ALBERT LYON, OF PHILADELPHIA, PENNSYLVANIA.

AUTOMOBILE BRACE BAR AND BUFFER.

Application filed January 14, 1920, Serial No. 351,284. Renewed January 26, 1922. Serial No. 532,031.

*To all whom it may concern:*

Be it known that I, GEORGE ALBERT LYON, a citizen of the United States, and resident of Philadelphia, county of Philadelphia, State of Pennsylvania, have made a certain new and useful Invention relating to Automobile Brace Bars and Buffers, of which the following is a specification, taken in connection with the accompanying drawing.

This invention relates especially to buffers or bumpers with which may be combined or incorporated brace bar portions to connect or reenforce the front ends of the frame members or other supports of the automobile or other vehicle from which the bumper may be adjustably or otherwise supported. For this purpose the frame ends which may be riveted or otherwise connected to the forward ends or portions of the usual channel section frame members of the vehicle, may advantageously be provided with laterally extending supporting bosses on one or both sides of each frame member, and an enclosing supporting clamp may cooperate with each boss either of which parts may be recessed to receive the brace bar portion. These clamps may tightly engage or enclose the brace bar portions of the buffer which may be of flat or of stiffened convex or bent cross-section preferably cupped or curved so as to fit the more or less rounded contact faces of the supporting bosses. In this way the brace bar portions may be strongly and rigidly clamped or secured to each of the frame members so as to connect and reenforce them and at the same time support the buffer front of any suitable construction which may be in the same plane or bent upward so as to be arranged in a higher plane than the connected rear supporting portions, and the buffer front may comprise one or more impact receiving portions integral with the brace bar portions of the buffer and spaced apart considerably therefrom so as to allow a considerable resilient yield of the buffer front under collision conditions. If desired also integral end loop portions may be connected to or formed on each end of the buffer front so as to project into protective position in front of or adjacent the vehicle wheels and also give added resilient yield in absorbing collision impacts. The brace bar and buffer may advantageously be formed of resilient strip such as tempered spring steel and one or more pieces of such material may be used to form each combined brace bar and buffer, lateral adjustability being secured where several intermeshing or connected strips are used.

In the accompanying drawing showing in a somewhat diagrammatic way various illustrative embodiments of this invention, Fig. 1 is a plan view showing one form of combined brace bar and buffer.

Fig. 2 is an enlarged plan view of the supporting device.

Fig. 3 is a transverse section thereof.

Fig. 4 is a plan view showing another form of brace bar and buffer.

Fig. 5 is a plan view showing still another construction; and

Fig. 6 is a transverse sectional view thereof showing a method of attaching the device to the springs of an automobile.

In the illustrative embodiment of the invention shown in Fig. 1 the brace bar portion may comprise two or more connected strips of spring steel or other suitable material preferably of a resilient character. These brace bar portions may be stiffened by forming the cooperating strips of convex or cupped section as indicated in Fig. 3 where the strips 4 and 10 are shown as of similarly curved or convex cross-section. The brace bar portion of each strip may advantageously have formed integral therewith a curved portion such as 3 to give increased resilience to the buffer front, and if desired, a suitable end loop portion 2 which may project out in front of the vehicle wheel can be connected to a spring strip impact receiving portion 1 spaced considerably away from the brace bar portion so that a considerable amount of resilient yield can take place under collision conditions which is advantageous in absorbing collision impacts. Such impact receiving portions particularly the end loop portions, are preferably given a flat cross-section to increase their resilient yielding under such conditions and for this reason the vertical width of the spring strip may advantageously many times exceed its thickness so as to give greatly increased vertical rigidity to this part of the buffer. In many cases it is desirable to form the buffer of two or more similar spring strip elements each of which may comprise a brace bar portion and an integral end loop and impact receiving portion, and by having the impact receiving portions more or less overlap adjacent the central part of the buffer front as by adjustably connecting them at this point the buffer may be given a reenforced front and also made laterally adjustable. For this purpose a cooperating spring strip element may comprise the impact receiving portion 7 and integral end loop 8, this strip merging into the stiffened section brace bar portion 9 which may overlap the brace bar portion of the other strip or strips employed. These overlapping impact receiving portions of the buffer may be adjustably or otherwise connected by any suitable means, such, for instance, as the clamping devices 24 which may more or less enclose these strips preferably adjacent their ends, such as 6, and connect them in a substantially vertically rigid manner where the type of Lyon clips shown in the Patent 1,198,246 of September 12, 1916 is used It is desirable to securely connect the cooperating brace bar portions of these resilient strip elements and this may be done in any suitable way preferably in connection with the supporting devices which connect these parts of the buffer strips to the frame members or other parts of the vehicle. As shown in Figs. 2 and 3 the channel section frame members 13 may have securely connected thereto in any desired way the supporting bosses 11 of malleable cast iron or the like which may have an integral supporting member 23 to be secured within the end of the cooperating frame member. These bosses or frame ends may be connected to the ends of the usual springs 66 as by the spring bolts 65. These supporting bosses which may project on one or both sides of the frame member are preferably given such shape as to properly cooperate with the style of brace bar portion of the buffer which is used and as shown these supporting bosses may be substantially cylindrical where the forwardly curved or convex brace bar sections such as 4, 10 are employed. One or more supporting clamps, such as 14, may be used to secure these brace bar portions to the frame member and if desired these supporting clamps may be formed with suitable recesses 18, the edges 19 of which may closely engage or cooperate with the edges of the cooperating brace bar portions of the buffer so as to prevent undesirable angular movement at this point and by tightening this supporting clamp as by screwing up the tightening bolt 16 connecting its ends 15 the desired security of connection may be effected between these parts. This arrangement also makes it possible to angularly adjust the position of the brace bar and impact receiving portions of the buffer by moving the supporting clamp into the desired angular position around its supporting boss and suitable locking devices may be used to definitely hold the parts in such desired adjusted position. For this purpose notches such as 21 may be formed in the suporting boss 11 preferably adjacent its lower portion and one or more locking projections 20 may be formed on one or more of the supporting clamps preferably adjacent their ends 15 and may engage these notches so that when the clamp is tightened no further substantial angular movement is posible between these parts. For some purposes it is also desirable to have suitable retaining devices to prevent the lateral disengagement of the clamps and bosses and for this purpose one or more retainer lugs such as 22, may be formed on the bosses outside of the clamps and where they have even a slight projection, considerably less than is diagrammatically indicated, the interlocking action thus secured positively prevents accidental disengagement of the parts. Such retainer lugs may advantageously be formed with detent portions 25 in such position as to positively support the edges of the brace bar portions of the buffer and prevent any undesirable or excessive downward movement thereof with respect to the supporting bosses and frame members. Thus when such detents are employed there is no possibility of the buffer swinging down to such an extent as to interfere with the wheels or other parts of the vehicle. Another retaining device, which may be used instead of or in addition to the retainer lugs described, is a retainer bar such as 17 of any suitable material which may have a series of holes or apertures to be engaged by tightening bolts 16 so that in this way lateral movement of the supporting clamps is positively prevented after the tightening has taken place. In this way the supporting clamps not only securely and rigidly connect the buffer front to the frame members of the automobile or other vehicle, but also so tightly secure the brace bar portions of the buffer to the frame members that a very considerable and desirable reenforcing and bracing action is thus secured correspondingly strengthening the ends of the frame members against lateral bending or breaking. This form of construction also secures a considerable range of lateral adjustment so that the buffer and brace bar are thus of adjustable width to fit automobiles having different width frames which is of course a considerable advantage.

It is not in all cases necessary, however, to have the combined brace bar and buffer formed of two or more cooperating and adjustably connected spring strip elements, since as shown in Fig. 4 the entire device may in some cases be formed of a single strip of resilient material which may have a brace bar portion 30 formed, if desired, with a forwardly projecting or convex section portion 31 which may die out at about the point 32 on each side so as to give the desired degree of resilient yield to the forwardly and outwardly curving portions 33, 37 and the connected end loops 34, 38. The integral connected impact receiving portions 35, 39 may be of such length that their ends 36, 40 overlap to a considerable extent to give a reenforced buffer front when these ends are connected in any suitable way as by enclosing clips or clamps 24. Fig. 5 shows still another arrangement in which the brace bar portion 41 of spring strip material may, if desired, be similarly stiffened by being cupped or bent in cross-section throughout at least the brace bar portion connected to the frame or other members of the automobile, and if desired this bent portion may die out at about the points 42 so as to render more resilient the curved yielding portions 43, 47 and the end loops 44, 48. The connected impact receiving portions 45, 49 which are thus spaced amply away from the brace bar portion 41 may be connected together in any suitable way preferably in connection with one or more reenforcing front members of any suitable character, such as the resilient front strip 64 so as to form a reenforced or multiple thickness strengthened buffer front which gives increased resistance and efficiency in absorbing collision impacts. If desired, suitable clamping devices, such as 24, may connect these front portions and may enclose the front strips adjacent the ends 65 of the reenforcing strip. It is also desirable in some cases to have an additional center clamp such as 54 which may enclose the ends 36, 50 of the front strips when they are substantially in line and hold them securely and rigidly against the cooperating portion of the reinforcing front strip.

These types of combined brace bar and buffer may also in many cases be advantageously used as rear buffers by directly connecting the brace bar portions to the rear springs of an automobile. As indicated in Figs. 5 and 6 the cupped or curved section brace bar portion 41 may fit against the elliptical or other rear springs 55 of the automobile so as to engage the same at the contact edges 56. The parts may be securely clamped in this position by devices comprising the clamping plates 57 and cooperating clamping U-bolts 58 which may have the yoke portion 62 extending around the spring while the shanks 58 of these U-bolts are preferably forced against the contact edges of the brace bar portion of the buffer. For this purpose the clamping plate may be formed with angularly arranged aligning ends 60 so that when the nuts 59 are tightened on these U-bolts or other connectors the aligning ends throw the shanks of these bolts toward each other so as to forcibly engage the contact edges 56 of the brace bar portion although considerable back lash or angular space 61 may be provided in each of the bolt holes. It is of course understood that with such a type of clamping device the buffer may be loosely connected to the rear springs and then slipped up or down along the same so as to bring it into the desired angular position before finally tightening or clamping the bolts to prevent further movement.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims.

I claim:

1. The combined automobile brace bar and buffer formed of adjustably connected resilient spring steel strip elements, each of said elements comprising a stiffened brace bar portion and a connected curved yielding portion and end loop and an impact receiving portion spaced away from said brace bar portion, said impact receiving portions of the buffer being adjustably connected in overlapping position to form a reenforced buffer front, supporting bosses to be mounted on the automobile and cooperating supporting clamps adapted to enclose and clamp around said supporting bosses and the brace bar portions of said buffer and formed with recesses to accommodate said brace bar portions.

2. The combined automobile brace bar and buffer formed of adjustably connected resilient strip elements, each of said elements comprising a brace bar portion and a connected curved yielding portion and an impact receiving portion spaced away from said brace bar portion, said impact receiving portions of the buffer being connected in overlapping position to form a reenforced buffer front, supporting bosses to be mounted on the automobile and cooperating supporting clamps adapted to enclose and clamp around said supporting bosses and the brace bar portions of said buffer and formed with recesses to accommodate said brace bar portions.

3. In automobile buffers, a resilient automobile buffer having a curved section supporting portion, oppositely extending supporting bosses connected to automobile frame members and projecting laterally therefrom and having supporting members of substantially the same curvature as the supporting portion of said buffer, a retainer lug on said bosses and adapted to engage the supporting portion of said buffer to prevent undesirable downward movement thereof and supporting clamps adapted to enclose said supporting portion and one of said bosses and be adjustably clamped in position thereon and formed with a recess to accommodate said supporting portion of said buffer.

4. In automobile buffers, a resilient automobile buffer having a bent section supporting portion, supporting bosses connected to automobile frame members and projecting laterally therefrom and having supporting members cooperating with the supporting portion of said buffer, a lug on said bosses adapted to engage the supporting portion of said buffer to prevent undesirable downward movement thereof and supporting clamps adapted to enclose said supporting portion and one of said bosses and be clamped in position thereon.

5. In automobile buffers, a resilient front automobile buffer having a curved section supporting portion, a supporting boss adapted to be connected to an automobile frame member and projecting laterally therefrom and having a supporting member cooperating with the supporting portion of said buffer, means on said boss adapted to engage the supporting portion of said buffer to prevent undesirable downward movement thereof and a supporting clamp adapted to enclose said boss and be clamped in position thereon and formed with a recess to accommodate said supporting portion of said buffer.

6. In automobile buffers, a resilient front automobile buffer having a supporting portion, a supporting boss adapted to be connected to an automobile frame member and projecting laterally therefrom and having a supporting member cooperating with the supporting portion of said buffer so as to be angularly adjustable with respect thereto, and a supporting clamp adapted to enclose said boss and be clamped in position thereon and cooperating with said supporting portion of said buffer.

7. The automobile buffer comprising a convex section supporting portion and a connected curved yielding portion and an impact receiving portion, supporting bosses adapted to be connected to the ends of the frame members of the automobile and shaped to cooperate with said supporting portion and cooperating supporting means adapted to enclose and clamp together said supporting bosses and supporting portion of said buffer and formed with recesses to accommodate said supporting portion.

8. The automobile buffer comprising a convex section supporting portion and a connected curved yielding portion and an impact receiving portion, supporting bosses adapted to be connected to the frame members of the automobile and shaped to cooperate with said supporting portion and cooperating supporting means adapted to clamp together said supporting bosses and supporting portions of said buffer.

9. The combined automobile brace bar and buffer comprising a brace bar portion and a connected curved yielding portion and an impact receiving portion spaced away from said brace bar portion, supporting bosses adapted to be connected to the frame members of the automobile and formed with projecting retainer lugs and with locking notches and cooperating supporting clamps adapted to enclose and clamp around said supporting bosses and the brace bar portions of said buffer and formed with recesses to accommodate said brace bar portion, locking projections on said supporting clamps adjacent a free end of the same to cooperate with said locking notches and a retainer bar connected to the supporting clamps on both of the cooperating supporting bosses of a frame member to prevent undesirable lateral movement of said supporting clamps.

10. The combined automobile brace bar and buffer comprising a brace bar portion and a connected curved yielding portion and an impact receiving portion spaced away from said brace bar portion, supporting bosses adapted to be connected to the frame members of the automobile and cooperating supporting clamps adapted to enclose and clamp around said supporting bosses and the brace bar portion of said buffer to adjust the vertical angle of said brace bar portion and connected impact receiving portions and a retainer connected to the supporting clamps on both of the cooperating supporting bosses of a frame member to prevent undesirable lateral movement of said supporting clamps.

11. The combined brace bar and buffer formed of resilient strip and comprising a stiffened convex section brace bar portion and an end loop and impact receiving portion to form a buffer front spaced away from said brace bar portion and means adapted to connect said brace bar portion to supporting members on both sides of a vehicle to support the buffer front therefrom and to simultaneously connect and reenforce said supporting members.

12. The combined brace bar and buffer formed of resilient strip and comprising a substantially straight brace bar portion and an impact receiving portion to form a buffer front spaced away from said brace bar portion and means adapted to connect the same strip of said brace bar portion to laterally separated supporting members on a vehicle to support the buffer front therefrom and to simultaneously connect and reenforce said supporting members.

13. The combined brace bar and buffer formed of resilient spring steel strip and comprising a plurality of elements each having a stiffened section brace bar portion and an integral end loop and impact receiving portion adapted to be adjustably connected to a cooperating portion to form a reenforced multiple thickness buffer front spaced away from said brace bar portion and means adapted to connect said brace bar portion to supporting members on both sides of an automobile to support the buffer front therefrom and to simultaneously connect and reenforce said supporting members.

14. The combined brace bar and buffer comprising a plurality of elements each having a stiffened section brace bar portion and an integral end loop and impact receiving portion adapated to be adjustably connected to a cooperating portion to form a reenforced multiple thickness buffer front spaced away from said brace bar portion.

15. The combined brace bar and buffer comprising a plurality of elements each having a brace bar portion adapted to extend between the frame members on opposite sides of the vehicle and having a resilient impact receiving portion adapted to be connected to a cooperating portion to form a buffer front spaced away from said overlapping brace bar portions.

16. The combined brace bar and automobile buffer formed of resilient spring steel strip and comprising two adjustably connected elements each comprising a stiffened convex section brace bar portion and an integral end loop and impact receiving portion to form a buffer front spaced away from said brace bar portion and means adapted to adjustably connect said brace bar portions to supporting members on both sides of an automobile to support the buffer front therefrom and to simultaneously connect and reenforce said supporting members.

17. The combined brace bar and automobile buffer formed of resilient strip and comprising two laterally adjustably connected elements having their ends connected in overlapping position and each comprising a brace bar portion and an integral end loop and impact receiving portion to form a buffer front spaced away from said brace bar portion and means adapted to connect said brace bar portions to supporting members on both sides of an automobile to support the buffer front therefrom and to simultaneously connect and reenforce said supporting members.

18. The combined brace bar and automobile buffer formed of resilient strip and comprising connected elements each comprising a brace bar portion and an impact receiving portion to form a buffer front spaced away from said overlapping brace bar portions and means adapted to connect both of said brace bar portions to supporting members on both sides of an automobile to support the buffer front therefrom and to simultaneously connect said supporting members.

19. The combined brace bar and automobile buffer formed of resilient strip and comprising a brace bar portion and an impact receiving portion to form a buffer front spaced away from said brace bar portion, supporting members permanently secured within the front ends of the channel iron frame members of the automobile to project forwardly therefrom and means adapted to adjustably connect said brace bar portions to said supporting members on both sides of the automobile to support the buffer front therefrom in vertically adjusted position and to simultaneously connect said supporting members.

20. In automobile buffers, a resilient front automobile buffer having a connected rearwardly arranged supporting portion, a supporting boss adapted to be connected to an automobile frame member and having a supporting member projecting forwardly from the frame member and adjustably co-operating with the supporting portion of said buffer, and a supporting clamp adapted to co-operate with said boss and be clamped in position thereon and secure thereto said supporting portion of said buffer in vertically adjusted position.

21. The automobile buffer comprising a supporting portion and a connected curved yielding portion and an impact receiving portion, supporting bosses adapted to be connected to front ends of the frame members of the automobile and shaped to adjustably co-operate with said supporting portion and co-operating supporting means adapted to clamp together said supporting bosses and supporting portions of said buffer in vertically adjusted position.

22. The combined brace bar and buffer formed of resilient strip and comprising a stiffened brace bar portion and an end loop and impact receiving portion to form a buffer front spaced away from said brace bar portion and means comprising supporting members permanently connected to the front ends of the vehicle frame members and adapted to adjustably connect said brace bar portion to the frame members on both sides of a vehicle front to support the buffer front therefrom in vertically adjusted position and to simultaneously connect and reenforce said supporting members.

23. The combined brace bar and buffer formed of resilient strip and comprising a substantially straight brace bar portion of bent stiffened section and a multiple strip impact receiving portion to form a stiffened buffer front spaced away from said brace bar portion and means adapted to connect said brace bar portion to supporting members on a vehicle to support the buffer front therefrom and to simultaneously connect and reenforce said supporting members.

24. In attaching devices for automobile buffers a supporting boss formed with an integral portion to be secured to the end of a channelled iron frame member of the vehicle, said supporting boss projecting laterally from said frame member and formed with a supporting portion having a curved contact face adapted to co-operate with a spring strip buffer supporting member, and clamping means adapted to enclose said boss and supporting member to securely connect said supporting member to said boss.

25. In attaching devices for automobile buffers, a supporting member to be secured to the end of a channelled frame member of the vehicle, said supporting member projecting from said frame member and formed with a supporting portion adapted to co-operate with a spring strip buffer supporting member and effect the adjustment of the buffer through a vertical angle, and clamping means adapted to engage said boss and supporting member to securely connect said supporting member to said boss.

26. In attaching devices to detachably support an automobile buffer, a supporting frame end having a securing portion adapted for permanent-built-in connection with the end of an automobile frame member, said frame end being formed with an integral head beyond the end of said frame member and provided with a bent contact face with which a transverse buffer member is adapted to cooperate, and enclosing clamping means angularly adjustable on said head and having a recess to accommodate said buffer member to clamp the same in vertically adjusted position.

27. In attaching devices to detachably support an automobile buffer, a supporting frame end having a securing portion adapted for permanent-built-in connection with the end of an automobile frame member, said frame end being formed with spring hangar connections and with a supporting portion adapted to extend beyond the end of said frame member and having a contact face with which a transverse buffer member is adapted to adjustably cooperate to adjust the vertical angle of the buffer, and supporting clamping means to connect said buffer member thereto.

28. In attaching devices to detachably support an automobile buffer, a supporting frame end adapted to be permanently connected to the depending end of a channelled automobile frame member, said frame end being formed with spring hangar connections and with a transverse portion having a curved contact face and an enclosing supporting clamp to be detachably clamped around a projecting portion of said frame end and having locking projections to lock the same in adjusted position with respect to said frame end, said supporting clamp being formed with a recess to accommodate a transversely extending buffer supporting member to be clamped to said frame end.

29. In attaching devices to detachably support an automobile buffer, a supporting frame end adapted to be permanently connected to the depending end of a channelled automobile frame member, said frame end being formed with spring hangar connections and with a transverse contact face and an enclosing supporting clamp to be detachably clamped around a projecting portion of said frame end, said supporting clamp being formed with a recess to accommodate a transversely extending buffer supporting member to be clamped to said frame end.

GEORGE ALBERT LYON.